United States Patent [19]
Shell

[11] 3,873,212
[45] Mar. 25, 1975

[54] OPTICAL COMPARATOR

[75] Inventor: Forney L. Shell, Fullerton, Calif.

[73] Assignee: The United States of America as represented by the Secretary of the United States Air Force, Washington, D.C.

[22] Filed: Jan. 20, 1972

[21] Appl. No.: 219,459

[52] U.S. Cl. .............................................. 356/168
[51] Int. Cl. ......................................... G01b 11/24
[58] Field of Search ........ 350/30, 10; 356/162, 168, 356/171

[56] References Cited
UNITED STATES PATENTS

| | | | |
|---|---|---|---|
| 2,984,147 | 5/1961 | Schoepe et al. | 356/171 |
| 3,202,047 | 8/1965 | Lawler | 350/30 |
| 3,331,119 | 7/1967 | Gingell et al. | 350/10 |
| 3,490,829 | 1/1970 | Weibrecht | 350/30 |

OTHER PUBLICATIONS

A. N. Budin et al., "Comparing Device," IBM Tech. Discl. Bul., 11/70, Vol. 13, No. 6, p. 1612.

Primary Examiner—Ronald L. Wibert
Assistant Examiner—Conrad Clark
Attorney, Agent, or Firm—Harry A. Herbert, Jr.; Arsen Tashjian

[57] ABSTRACT

An apparatus for optically comparing an opaque object and a transparent object which are in geometric alignment. The apparatus includes: a source of light, emitting a beam of light; a fixedly positioned beam splitter, so disposed that the beam of light impinges upon it at 45°; and a magnifying lens, disposed forward of the beam splitter and adjustable for focusing and viewing whose optical axis is at 45° to the beam splitter. The opaque object is positioned rearward of, and at 45° to, the beam splitter. The transparent object is positioned between the beam splitter and the magnifying lens and at 45° to the beam splitter. The opaque object, the beam splitter, the transparent object, and the magnifying lens are in optical alignment; and, the opaque object and the transparent object are geometrically aligned. Because of the path of the beam of the light, the opaque object becomes front lighted and the transparent object becomes back lighted. Both objects may be then viewed through the magnifying lens in magnified form, and directly and simultaneously, in superimposition, for comparison.

1 Claim, 2 Drawing Figures

PATENTED MAR 25 1975    3,873,212

OPTICAL COMPARATOR

BACKGROUND OF THE INVENTION

This invention relates to an optical comparator and, more particularly, to an apparatus for optically comparing an opaque object which are in geometric alignment and a transparent object.

Apparatus for optically comparing objects, i.e. optical comparators, comparascopes and the like, hereinafter referred to as optical comparators are not, per se, novel. They are known in the optical art, and it may be fairly and accurately stated that present state-of-the-art optical comparators suffer from distinct and severe disadvantages. In this connection it is to be noted that present state-of-the-art optical comparators are characterized by the use of reflected images, or double reflected images, projected onto a viewing screen or against a fixed grid pattern to effectuate comparison of the objects. As a result, the optical system of a typical optical comparator contains numerous optical components with resultant high loss of light within the system; and, the problem becomes further aggravated if magnification or enlargement of the images is necessary or is desired. Further, this light loss may require the use of high intensity light, or of a plurality of lights, with the result that cooling of the light source may become necessary. Additionally, the typical opticalcomparator may be described, not only as complex but also as large and bulky. Also, none of the known optical comparators permit or allow the direct and simultaneous viewing, in superimposition, of the objects to be compared, rather than of the reflected images of the objects with the obvious advantages connected therewith.

There exists, therefore, a genuine need for an optical comparator which has a minimum of optical and other components, which does not require a high intensity light source, or a plurality of lights and cooling, which is small and easily portable, and which permits direct, magnified and simultaneous viewing, in superimposition, of the objects to be compared, rather than of the reflected images of the objects.

I have invented such an optical comparator and have, thereby, significantly advanced the state-of-the-art.

SUMMARY OF THE INVENTION

This invention relates to an optical comparator which will permit the direct, magnified and simultaneous viewing, in superimposition, of an opaque object and of a transparent object for comparison.

Obviously, therefore, an object of this invention is to provide an apparatus for optically comparing an opaque object and a transparent object by the simultaneous viewing, in superimposition and in magnified form, of the objects.

Another object of this invention is to provide an optical comparator which will permit comparison of the two objects directly, rather than of the reflected images, or double reflected images, of the objects.

Still another object of this invention is to provide an optical comparator which comprises a minimum of optical and other components and is, therefore, simple in comparison with present state-of-the-art optical comparators.

A further object of this invention is to provide an optical comparator which does not require a high intensity light source, or a plurality of lights, and cooling.

A still further object of this invention is to provide an optical comparator which is small and easily portable.

These objects, and other and related ones, of this invention will become readily apparent after a consideration of the description of the invention and reference to the drawings.

DESCRIPTION OF THE PREFERRED EMBODIMENT

My novel optical comparator can be better appreciated if the following four preliminary matters are noted and remembered.

Firstly, the terms "optically aligned", "optical alignment", and the like, are used herein in the interest of brevity and are intended to mean herein, and in the optical art, that the optical components or other objects referred to are in line with each other in the sense that they are in the path of the beam of light which is being emitted, or reflected, or transmitted or the like.

Secondly, the preferred embodiment of my novel optical comparator as shown and described herein is adapted, as a matter of illustration and not of limitation, for use in comparing an opaque photograph of an incomplete assembly (or the actual incomplete assembly) with a photographic transparency (such as a photographic negative or a transparent positive film) which shows thereon only the parts to be added to the incomplete assembly, since there is a current need for such comparison, rapidly and easily, in industry. However, it will become obvious that my invention readily may be adapted to compare other opaque objects and other transparent objects. As a matter of convenience the opaque object above described will be referred to herein and in describing the mode of operation of the preferred embodiment as, "the photograph", or the like, and the transparent object above described will be referred to as, "the transparency", or the like.

Figure 1:
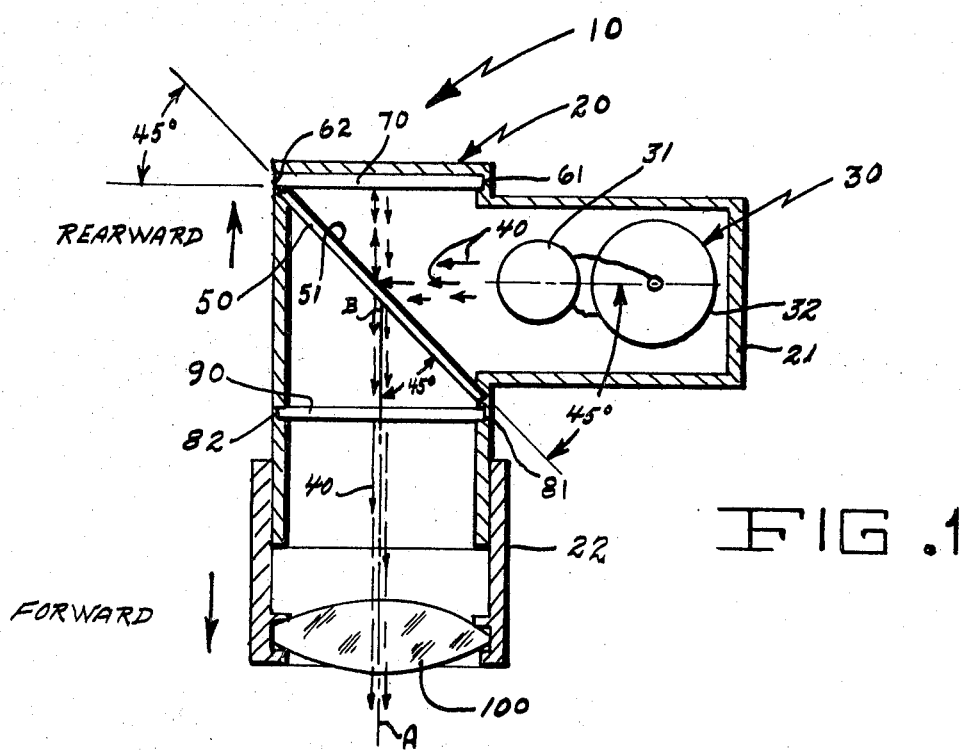
FIG. 1 is a top plan view, in cross-section and in schematic form, of a preferred embodiment of the invention, showing the relative position of the components of the embodiment and of the objects to be compared.

Thirdly, the directional designations "forward" and "rearward" and the like are intended to mean the directions as indicated by the arrows in FIG. 1.

Fourthly, the term "direct viewing", or the like, when used herein in connection with the invention in comparing the objects is intended to mean the viewing of direct, and not reflected, images of the objects being compared.

With reference to FIG. 1, therein is shown a top plan view in cross-section and in schematic form of a preferred embodiment 10 of my optical comparator as adapted for use in comparing a photograph, the opaque object as described above and a transparency, the transparent object as described above.

Preferred embodiment 10 includes: housing 20 with light source portion 21 and magnifying lens focusing barrel portion 22 which is rotatably and slideably movable; source of light 30, such as bulb 31 in electrical connection with battery 32, emitting a beam of light 40;

fixedly positioned beam splitter 50 with anti-glare coating 51, which is disposed so that beam of light 40 impinges upon it at an angle of 45°; means, such as a slot (not shown in FIG. 1) with grooves 61 and 62 rearward of beam splitter 50 for removably holding and supporting the opaque photograph 70 at an angle of 45° to, and in optical alignment with, beam splitter 50; means, such as a slot (not shown in FIG. 1) with grooves 81 and 82 forward of beam splitter 50 for removably holding and supporting the transparency 90 at an angle of 45 degrees to, and in optical alignment with, the beam splitter 50; and, a magnifying lens 100, mounted in focusing barrel portion 22 of housing 20 which is adjustable for focusing and viewing disposed forward of means for removably holding and supporting transparency 90, and having an optical axis A–B which is at 45 degrees to, and in optical alignment with, beam splitter 50.

Opaque object 70, the photograph, and transparent object 90, the transparency, are in planes parallel to each other and are in geometric alignment. Also, as can be easily seen in FIG. 1, opaque object 70, beam splitter 50, transparent object 90 and magnifying lens 100 are in optical alignment.

Figure 2:
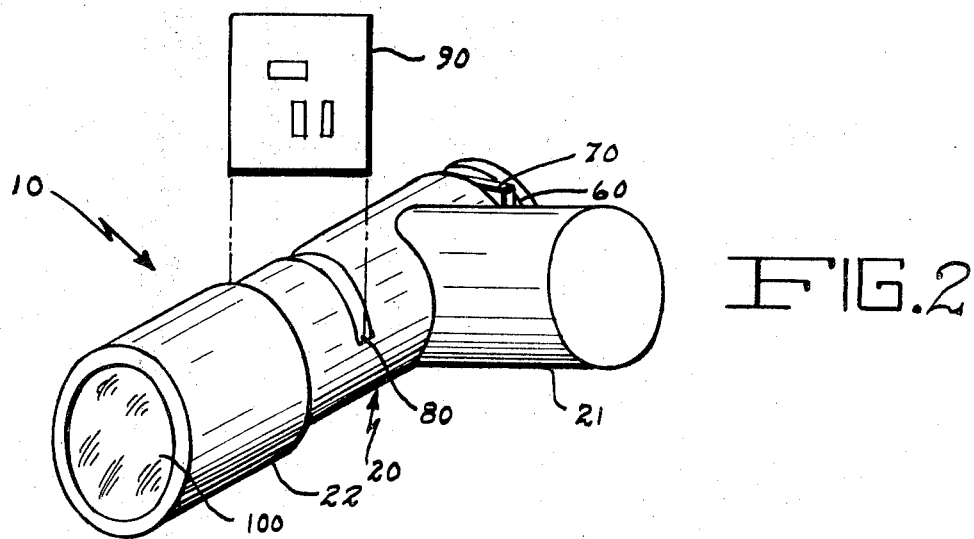
FIG. 2 is a perspective view, in simplified form and partially fragmented, of the exterior of the preferred embodiment shown in FIG. 1, showing in phantom how the transparent object to be compared is removably inserted into the embodiment.

With reference to FIG. 2, therein is shown a perspective view, in simplified form and partially fragmented, of the exterior of the preferred embodiment 10 of my optical comparator shown in FIG. 1, and also shown, in phantom, is how the transparent object 90 is removably inserted into the preferred embodiment 10.

Also shown in FIG. 2 are: housing 20 with light source portion 21 and magnifying lens focusing barrel portion 22; slot 60 of the means for removably holding and supporting opaque object 90 in the desired position; and magnifying lens 100.

MODE OF OPERATION OF THE PREFERRED EMBODIMENT

When the opaque object 70, the photograph of the incomplete assembly, and the transparent object 90, a transparency showing the parts to be added to the incomplete assembly, are to be optically compared, the photograph 70, FIGS. 1 and 2, is removably inserted into slot 60, FIG. 2, and into grooves 61 and 62 thereof, FIG. 1, and transparency 90, FIGS. 1 and 2, is removably inserted into slot 80, FIG. 2, and into grooves 81 and 82 thereof, FIG. 1. The objects 70 and 90, FIGS. 1 and 2, may then be conveniently viewed and easily compared, through magnifying lens 10, FIGS. 1 and 2, in magnified form and directly and simultaneously, in superimposition, after magnifying lens 10 is focused to the satisfaction of the viewer.

More specifically and with reference to FIG. 1, after photograph 70 and transparency 90 are properly positioned, in their respective holding and supporting means, as shown in FIG. 1, the beam of light 40 emitted by bulb 31 of light source 30 impinges upon beam splitter 50. Light beam 40 is reflected rearwardly by beam splitter 50 and impinges perpendicularly upon photograph 70, thereby front lighting and illuminating it. The beam of light 40 is then reflected forwardly by photograph 70 and impinges upon beam splitter 50 which, in turn, transmits, i.e. permits the passage of light beam 40 forwardly. The beam of light 40 then impinges upon transparency 90, thereby back lighting and illuminating tranparency 90. Then, the beam of light 40 passes through transparency 90 and impinges upon magnifying lens 100, which then may be adjusted and focused to the satisfaction of the viewer to compare, through magnifying lens 100, the two objects.

As a related matter, it is to be noted that anti-glare coating 51, FIG. 1, prevents glare from reaching the viewer, i.e. the observer. Further, the compared objects 70 and 90, FIGS. 1 and 2, (or, more precisely, the direct images of the objects) are seen in registration by the viewer. Additionally, it is to be remembered that the representation of light beam 40 in FIG. 1 is only schematic. The width of the actual beam of light which is emitted by light source 30, FIG. 1, is more than sufficient to impinge upon and illuminate the entire photograph 70, FIGS. 1 and 2, and the entire transparency 90, FIGS. 1 and 2.

While there have been shown and described the fundamental features of the invention, as applied to a preferred embodiment and as adapted for a particular use, it is to be understood that various substitutions and omissions may be made by those of ordinary skill in the art without departing from the spirit of the invention.

What is claimed is:

1. An optical comparator for comparing two objects, an opaque one and a transparent one, by permitting the magnification, and the direct and simultaneous viewing, in superimposition, of the two objects which are in geometric alignment comprising:

a. a source of light, with said source emitting a beam of light;
   b. a fixedly positioned beam splitter, so disposed that said beam of emitted light impinges upon it at an angle of 45°, with said beam splitter having an anti-glare coating on the surface upon which said beam of light impinges, and with said beamsplitter reflecting rearwardly said impinging beam of light;
   c. means, rearward of said beam splitter, for removably holding and supporting the opaque object to be compared at an angle of 45° to, and in optical alignment with, said beam splitter, and in a plane perpendicular to the beam of light reflected by said beam splitter;
   d. means, forward of said beam splitter, for removably holding and supporting the transparent object to be compared at an angle of 45° to, and in optical alignment with, said beam splitter, and in a plane parallel to the plane of the opaque object to be compared;
   e. a magnifying lens, adjustable for focusing and viewing, which is disposed forward of said means for removably holding and supporting the transparent object to be compared, with said magnifying lens having an optical axis which is at 45° to, and in optical alignment with, said beam splitter;
   f. and, a housing to contain said source of light, said beam splitter, said means for removably holding and supporting the opaque object to be compared, said means for removably holding and supporting the transparent object to be compared, and said magnifying lens;

whereby when the opaque object and the transparent object are positioned in their respective holding and supporting means, the opaque object, said beam splitter, the transparent object, and the magnifying lens are in optical alignment, and the opaque object and the transparent object are in geometric alignment, and the light reflected rearwardly by said beam splitter impinges upon, front lights, and illuminates the opaque object, and is then reflected by the opaque object forwardly to said beam splitter which transmits forwardly the light reflected by the opaque object, with the forwardly reflected light impinging upon, back lighting, and illuminating the transparent object, and with the light then passing through the transparent object and impinging upon said magnifying lens, thereby permitting the magnification, and the direct and simultaneous viewing, in superimposition and, therefore, a comparison, of the opaque object and of the transparent object, through said magnifying lens.

* * * * *